United States Patent
Hepper

(10) Patent No.: US 9,792,696 B2
(45) Date of Patent: Oct. 17, 2017

(54) METHOD AND APPARATUS FOR TRACKING THE MOTION OF IMAGE CONTENT IN A VIDEO FRAMES SEQUENCE USING SUB-PIXEL RESOLUTION MOTION ESTIMATION

(71) Applicant: THOMSON LICENSING, Issy les Moulineaux (FR)

(72) Inventor: Dietmar Hepper, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 141 days.

(21) Appl. No.: 14/942,923

(22) Filed: Nov. 16, 2015

(65) Prior Publication Data
US 2016/0148392 A1  May 26, 2016

(30) Foreign Application Priority Data
Nov. 21, 2014 (EP) ..................................... 14306853

(51) Int. Cl.
G06K 9/00 (2006.01)
G06T 7/20 (2017.01)
G06T 7/207 (2017.01)

(52) U.S. Cl.
CPC ............ *G06T 7/2073* (2013.01); *G06T 7/207* (2017.01); *G06T 2207/10016* (2013.01); *G06T 2207/20016* (2013.01)

(58) Field of Classification Search
CPC ................... G06T 7/2073; G06T 7/207; G06T 2207/10016; G06T 2207/20016
See application file for complete search history.

(56) References Cited

U.S. PATENT DOCUMENTS 6,104,439 A    8/2000 Jeong et al.
7,792,191 B2    9/2010 Kwon
(Continued)

FOREIGN PATENT DOCUMENTS

CN    101841703    1/2012
CN    103313058    9/2013
EP     2381418    10/2011

OTHER PUBLICATIONS

Search Report Dated Sep. 23, 2015.

*Primary Examiner* — Shefali Goradia
(74) *Attorney, Agent, or Firm* — Tutunjian & Bitetto, P.C.

(57) ABSTRACT

The motion of image content such as a point of interest in a video frames sequence is tracked using sub-pixel resolution motion estimation in forward and/or backward direction. The motion of image content or a point of interest between a reference frame and a following frame is estimated, starting from an integer pixel position in the reference frame. If the motion vector has a position between integer pixel positions, the coordinates of that motion vector are replaced by an adjacent integer pixel position in the following or previous frame, and the error value between these coordinates and the replacement coordinates is stored. Thereafter the following or previous frame is defined as the current frame, the motion of the object is estimated between the replacement coordinates in the current frame and a following frame, and the stored error value is added in opposite direction to the corresponding motion vector, so as to get a corresponding precise motion vector. If the precise motion vector has a position between integer pixel positions in the following or previous frame, its coordinates are replaced by an adjacent integer pixel position in the following or previous frame, and the corresponding error value is stored, and so on.

22 Claims, 7 Drawing Sheets

(56) References Cited

U.S. PATENT DOCUMENTS

| | | |
|---|---|---|
| 8,498,338 B1 | 7/2013 | Wang et al. |
| 2009/0180032 A1* | 7/2009 | Heng .................... G06T 7/223 |
| | | 348/699 |
| 2010/0111182 A1 | 5/2010 | Karczewicz et al. |
| 2013/0028530 A1* | 1/2013 | Drugeon .............. H04N 19/136 |
| | | 382/233 |
| 2013/0076915 A1 | 3/2013 | Ramachandran et al. |

* cited by examiner

```
processing  |              frame number
sequence    |    1      2      3     4=F     5      6      7

1.      |                        S<----x
    2.      |                 S<----x
    3.      |          S<----x
    4.      |                               x---->S
    5.      |                                      x---->S
    6.      |                                             x---->S
   etc.     |                        etc.
```

Estimated coordinate: $X_2$ $X_3$
Rounded coordinate: $X_2'$ $X_3'$
Rounding offset or error: $e_2 =: X_2 - X_2'$
Corrected next coordinate: $X_3'' = X_3 + e_2$

A

B

C

A

B

C

METHOD AND APPARATUS FOR TRACKING THE MOTION OF IMAGE CONTENT IN A VIDEO FRAMES SEQUENCE USING SUB-PIXEL RESOLUTION MOTION ESTIMATION

This application claims the benefit, under 35 U.S.C. §119 of European Patent Application No. 14306853.4, filed Nov. 21, 2014.

FIELD OF THE INVENTION

The invention relates to a method and to an apparatus for tracking the motion of image content such as a point of interest or an object or a group of pixels in a video frames sequence using sub-pixel resolution motion estimation.

BACKGROUND OF THE INVENTION

Companies are interested in allowing insertion or replacement of advertisements within existing image/video/film sequences. A human operator can identify areas of interest that allow carrying advertisements—such as plain walls of buildings. Such areas need to be tracked along the image sequence by means of motion estimation and tracking processing. As an alternative, areas of interest can be identified automatically or semi-automatically, provided the necessary technology is available. One approach would be to place, in a single image frame F, markers (e.g. small squares or rectangles or even points) at positions in and/or around areas of interest that seem appropriate for motion estimation and tracking along the video sequence. The corresponding image content or rather (center) pixel, found by motion estimation, feature point tracking or other methods in the next frame F+1, is used as a starting point for estimating the motion from frame F+1 to frame F+2, etc. In case of integer pixel motion estimation, there may result a spatial deviation from the precise motion in the scene, which deviation may accumulate over time and result in misplaced points. For good-quality point tracking, sub-pel resolution is required in the motion estimation. Typically, integer-pel motion estimation—by hierarchical motion estimation or other methods—is carried out first, followed by sub-pel refinement stages.

SUMMARY

However, without further measures, also spatial deviations resulting from sub-pel resolution motion estimation may accumulate over time, and can lead to even worse processing results.

A problem to be solved is to provide improved-accuracy tracking of objects or points of interest in video sequences over time, allowing improved-accuracy image content.

The described processing can be used for motion estimation and tracking of image content, such as a point or points of interest or an object or a group of pixels, over a long sequence of frames with sub-pel resolution, without or with only marginal accumulated spatial deviations over time. Initially, motion estimation for specific image content (which term in the following can mean point or points of interest or an object or a group of pixels) is performed with integer-pel resolution, followed by sub-pel refinement. Advantageously thereby computational complexity is reduced. Hierarchical motion estimation or any other suitable motion estimation can be used. The spatial offset introduced when rounding sub-pel motion vector x-y coordinates found for a current frame to the integer-pel grid, prior to the motion estimation for the following frame, is compensated. This processing allows tracking of specific image content or points of interest, as determined in a specific frame out of a long sequence of frames, over that long sequence of frames with improved reliability and accuracy.

The processing is performed from the reference frame in forward and/or in backward directions, e.g. until a scene change occurs or is detected.

In principle, the described method is adapted for tracking the motion of an image content, such as a point of interest or an object or a group of pixels, in a video frames sequence using sub-pixel resolution motion estimation, comprising:

a) estimating the motion of an image content between a reference frame and a following or preceding frame, starting from an integer pixel position in said reference frame;

b) if the end point of the corresponding motion vector has a position between integer pixel positions in said following or preceding frame, replacing the coordinates of said motion vector end point by the coordinates of an adjacent integer pixel position in said following or preceding frame, and storing the error value between said end point coordinates and said replacement coordinates;

c) defining said following or preceding frame as a current frame, and estimating the motion of said point of interest or of said object between said replacement coordinates in said current frame and a following or preceding frame;

d) correcting the following or preceding frame end point coordinates of the corresponding motion vector by using said stored error value in opposite direction, so as to get a corresponding precise motion vector;

e) if the end point coordinates of said precise motion vector have a position between integer pixel positions in said following or preceding frame, replacing the coordinates of said precise motion vector end point by the coordinates of an adjacent integer pixel position in said following or preceding frame, and storing the error value between said end point coordinates and said replacement coordinates;

f) continuing with step c) for further frames of said video frames sequence.

In principle the described apparatus is adapted for tracking the motion of an image content, such as a point of interest or an object or a group of pixels, in a video frames sequence using sub-pixel resolution motion estimation, said apparatus comprising means adapted to:

a) estimating the motion of an image content between a reference frame and a following or preceding frame, starting from an integer pixel position in said reference frame;

b) if the end point of the corresponding motion vector has a position between integer pixel positions in said following or preceding frame, replacing the coordinates of said motion vector end point by the coordinates of an adjacent integer pixel position in said following or preceding frame, and storing the error value between said end point coordinates and said replacement coordinates;

c) defining said following or preceding frame as a current frame, and estimating the motion of said point of interest or of said object between said replacement coordinates in said current frame and a following or preceding frame;

d) correcting the following or preceding frame end point coordinates of the corresponding motion vector by using said stored error value in opposite direction, so as to get a corresponding precise motion vector;

e) if the end point coordinates of said precise motion vector have a position between integer pixel positions in said following or preceding frame, replacing the coordinates of said precise motion vector end point by the coordinates of an adjacent integer pixel position in said following or preceding frame, and storing the error value between said end point coordinates and said replacement coordinates;

f) continuing with process c) for further frames of said video frames sequence.

BRIEF DESCRIPTION OF THE DRAWINGS

Exemplary embodiments of the processing are described with reference to the accompanying drawings, which show in.

DETAILED DESCRIPTION

Even if not explicitly described, the following embodiments may be employed in any combination or sub-combination.

Besides of estimating a motion vector for every picture element in a frame, a hierarchical motion estimator with e.g. block matching can be adapted for tracking specified image content or points/pixels of interest. Other types of motion estimation like gradient-based, phase correlation, 'optical flow' processing can also be used.

Figures 1, 2:
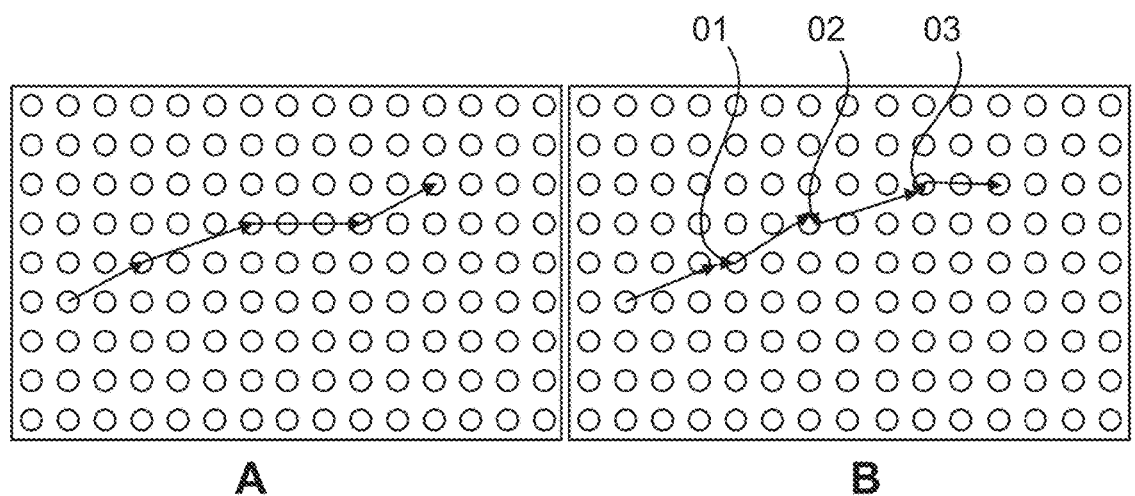
FIG. 1 forward and backward motion estimation for point-of-interest image content tracking.
FIG. 2 example point-of-interest tracking for integer-pel motion estimation and for sub-pel motion estimation.

A number of such pixels of interest are defined for a selected frame F in a stored frame sequence. In FIG. 1 frame F=4 is selected. Motion estimation is carried out starting from frame F in forward and backward directions (or vice versa), as depicted in FIG. 1. The match of these pixels of interest found in frame F−1 is used as a new point x-y coordinate for finding a match of these pixels of interest in frame F−2, and so on. In the same manner, the match found in frame F+1 is used as a new point x-y coordinate for finding a match in frame F+2, and so on.

Because the precise motion of an object within the successive frames may correspond to sub-pixel x-y positions, the estimated motion vector end point may lie slightly besides the correct motion vector end point.

If sub-pel motion estimation is applied, the sub-pel x-y coordinates found in frame F−1 are rounded to the nearest integer-pel position, and the hierarchical search with respect to frame F−2 is started from that nearest integer-pel position.

Because a measurement window is used in the motion estimation, however small it may be in the final levels of the hierarchy, a match is actually found for a small part of the image—i.e. a small neighborhood of the point of interest or object or a piece of image content—rather than for a single picture element, such that a slightly shifted motion vector will still be valid for that object.

FIG. 2A shows for a moving object an example point-of-interest (PoI) tracking over 4 successive frames using integer-pel motion estimation, e.g. hierarchical motion estimation (HME) with integer-pel resolution at the finest level. The motion vectors always point to the original pixel scanning grid, i.e. an integer pixel grid. Points of interest are tracked from a pixel position to a pixel position from frame to frame. Because the precise motion of the object within the successive frames may correspond to sub-pixel x-y positions, the estimated motion vector end point may lie slightly besides the correct motion vector end point. The tracking results obtained in this way make sense.

FIG. 2B shows for a moving object an example point-of-interest (PoI) tracking over 4 successive frames using sub-pel motion estimation, e.g. hierarchical motion estimation with sub-pel resolution at the finest level. The resulting motion vectors in most cases point to x-y positions between the original pixel grid. Points of interest are tracked from a pixel position to a sub-pixel position from one frame to the following frame. In that following frame, tracked point x-y coordinates are rounded, or cut off, to (normally) the nearest pixel of the original pixel grid before starting the first level of HME for this frame. The resulting offsets O1, O2, O3 are thus neglected in further frames motion estimation.

By rounding/cutting off the sub-pel component before motion estimation for the next frame, some of the accuracy obtained by sub-pel motion estimation and tracking is lost. The result may be even worse—if no further measures are taken—than with integer-pel motion estimation where no position rounding errors arise.

Figure 3:
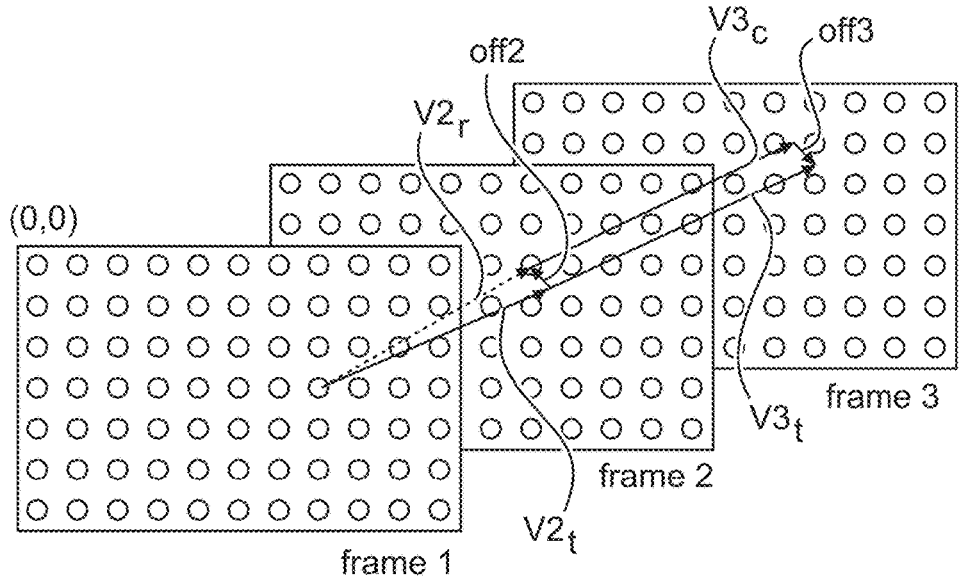
FIG. 3 rounding estimated coordinates, and adding the rounding offset or error after motion estimation for the next frame.

For improving image content or point tracking processing in case of motion estimation with sub-pel x-y resolution, different methods are considered in the following, comprising dealing with ½-pel x-y coordinates, which methods make use of the sub-pel x-y components removed (i.e. 'rounding vectors' or offsets or errors) by storing them in connection with the rounding/cutting-off procedure and adding them again later:

a) ½-pel resolution x-y coordinates are simply rounded (0.5 and −0.5 are rounded away from zero) or cut off (0.5 and −0.5 are rounded towards zero) in an alternating manner from frame to frame, using rounding mode in odd frames and cutting off mode in even frames (or vice versa);

b) Like (a) but the mode is alternated with respect to the previous occurrence of rounding or cutting off, i.e. successive cases where the estimated x (or y, respectively) coordinate lies on the integer pixel grid are ignored and rounding in one ½-pel occurrence is followed by cutting off in the next occurrence, and vice versa.

c) Offsets are stored for the next-frame processing. In the present frame, x and/or y offsets stored in the previous frame are added to the motion vector obtained in the finest integer-pel level of the motion estimation hierarchy (or other integer-pel motion estimation) before starting the sub-pel refinement level or levels. Distinction is necessary between e.g. ½-, ¼- and ⅛-pel levels. First, an offset is subdivided into its ½-, ¼- and ⅛-pel contributions. The ½-pel part of the offset is than added prior to the ½-pel refinement level, the ¼-pel part of the offset is than added prior to the ¼-pel refinement level, etc. This is done in order to allow proper correction in the respective sub-pel refinement level.

d) Similar to (c) but stored offsets are added only after the finest sub-pel level of the hierarchy, as depicted in FIG. 3. This is done because, due to the rounding/cutting before the coarsest (i.e. first) level of the hierarchy, the motion vector then found applies to a slightly shifted location in an object compared to the previous location, and this shift must be compensated for in order to return to the intended location within that object. After rounding the vectors or coordinates estimated for the points of interest in a frame, the differences between the estimated and the rounded coordinates are computed as offsets or rounding errors and are stored. Following the final sub-pel refinement level of the motion estimation for the next frame processed, these offsets are added to the new estimated coordinate, and so on.

In FIG. 3, the estimated or precise sub-pel resolution motion vector $v_{2t}$ having coordinates $(x_2, y_2)$ is rounded to the rounded sub-pel resolution motion vector $v_{2r}$ having coordinates $(x'_2, y'_2)$. The corresponding rounding offset or error $(x_2-x'_2, y_2-y'_2)$ representing an offset vector $off_2$ is stored. Motion estimation for the next frame starts from the rounded vector coordinate $(x'_2, y'_2)$ and leads to a position $(x_3, y_3)$ of estimated sub-pel resolution motion vector $v_{3c}$. This position or coordinate is corrected by the negated stored rounding offset error $off_2$ $(x_2-x'_2, y_2-y'_2)$, representing a correction offset vector $off_3$. Thereby the estimated sub-pel resolution motion vector $v_{3c}$ is shifted to the position of the precise sub-pel resolution motion vector $v_{3t}$, which starts from coordinates $(x_2, y_2)$ and ends at coordinates $(x''_3, y''_3)$.

Figure 4:
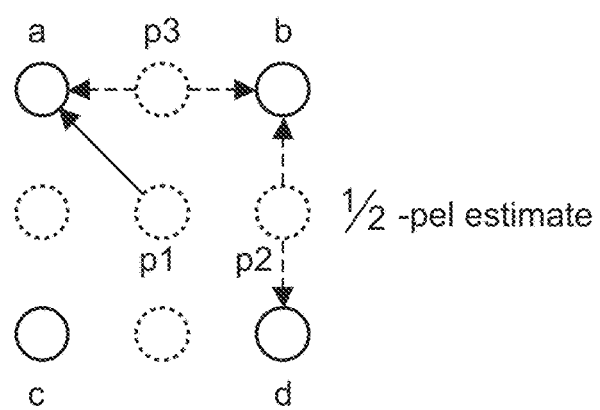
FIG. 4 rounding of ½-pel contributions of motion estimates.

In a further embodiment, when considering that a motion vector end point should still lie within the intended object after rounding/cutting off, rounding off in case a ½-pel pixel coordinate $p_1$ in x and y directions was found is carried out towards the image signal (e.g. luminance or U or V or R or G or B value) or amplitude value of that neighboring pixel out of the four neighboring pixels a, b, c, d, which has an image signal or amplitude value most similar to the interpolated image signal or amplitude value of the ½-pel coordinate interpolated pixel (e.g. $p_1$ to a, for instance smallest Euclidean distance or MSE or other similarity measure in RGB, YUV, Y or other color space), as shown in FIG. 4.

In case of ½-pel resolution coordinate in x or y directions of the motion vector end point, the rounding or cutting off is carried out towards the image signal or amplitude value of that neighboring pixel out of the two horizontally or vertically neighboring pixels a, b, c, d which has an image signal or amplitude value most similar to an interpolated image signal or amplitude value of the ½-pel coordinate interpolated pixel p2 or p3, respectively.

A further way is rounding towards the image signal or value of the corresponding pixel specified originally in frame F in FIG. 1. This will work as long as the pixel's color does not change significantly versus time due to e.g. different lighting conditions, perspective, and/or distance from camera.

A still further way will therefore be rounding towards the stored updated value of the pixel, wherein that updated value is stored instead of the initial one. It is updated after motion estimation of each frame, using the sub-pel interpolated signal.

Finally, the image content or point-of-interest PoI coordinates found in the frames of the sequence can be gathered in an array and written to a file.

Figure 8:
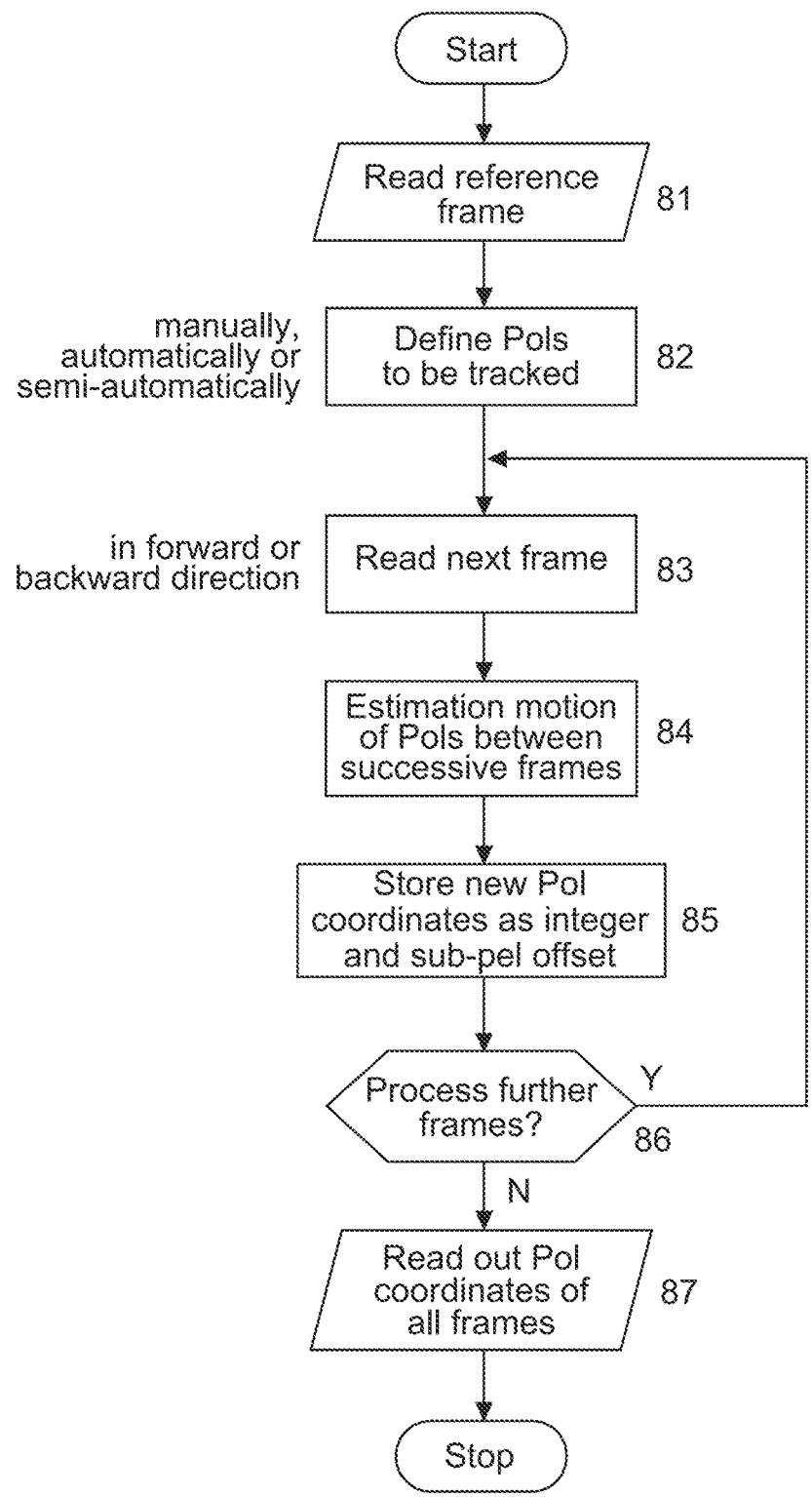
FIG. 8 flow chart for the processing.

In the processing flow chart FIG. 8 a reference frame is read in step 81, and manually, semi-automatically or automatically PoIs to be tracked are defined in step 82. In step 83 the next frame in forward or backward direction is read and the motions of the PoIs between successive frames are estimated in step 84. The resulting new PoI coordinates are stored as integer resolution rounded positions and as related sub-pel offsets in step 85. If in step 86 there are further frames to be processed, the processing continues with step 83, otherwise the PoI coordinates of all frames are read out in step 87.

Figure 9:
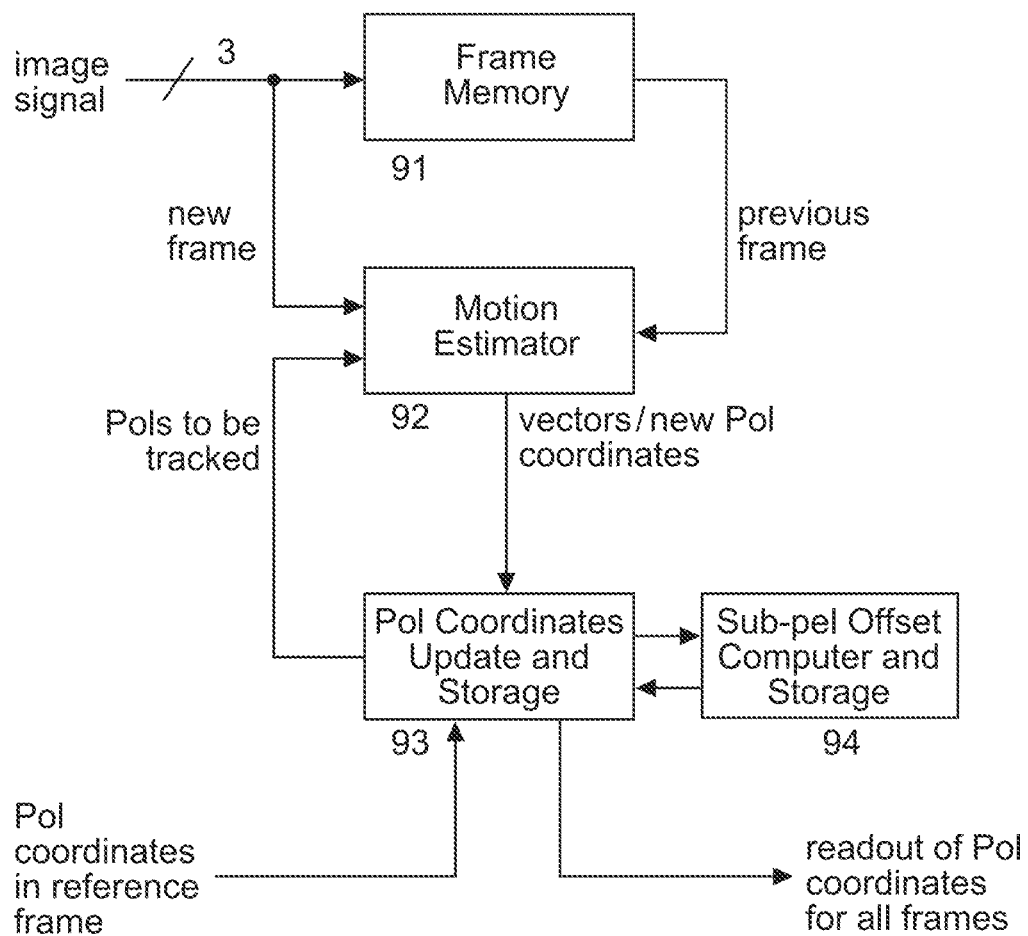
FIG. 9 block diagram for the processing.

In FIG. 9, the PoI coordinates in reference frame F (cf. FIG. 1) are provided to a PoI coordinates update and storage unit 93. A current frame of an image signal (from reference frame F in forward or backward direction, e.g. taken from mass storage) is written frame-wise into a frame memory 91, and the current frame and its previous frame are fed to a motion estimator 92, together with the PoIs to be tracked from unit 93. Motion estimator 92 outputs calculated motion vectors and related new PoI coordinates to unit 93. A sub-pel offset computing and storage unit 94 receives the required values from unit 93 and feeds correspondingly computed and stored values back to unit 93.

Figure 5:
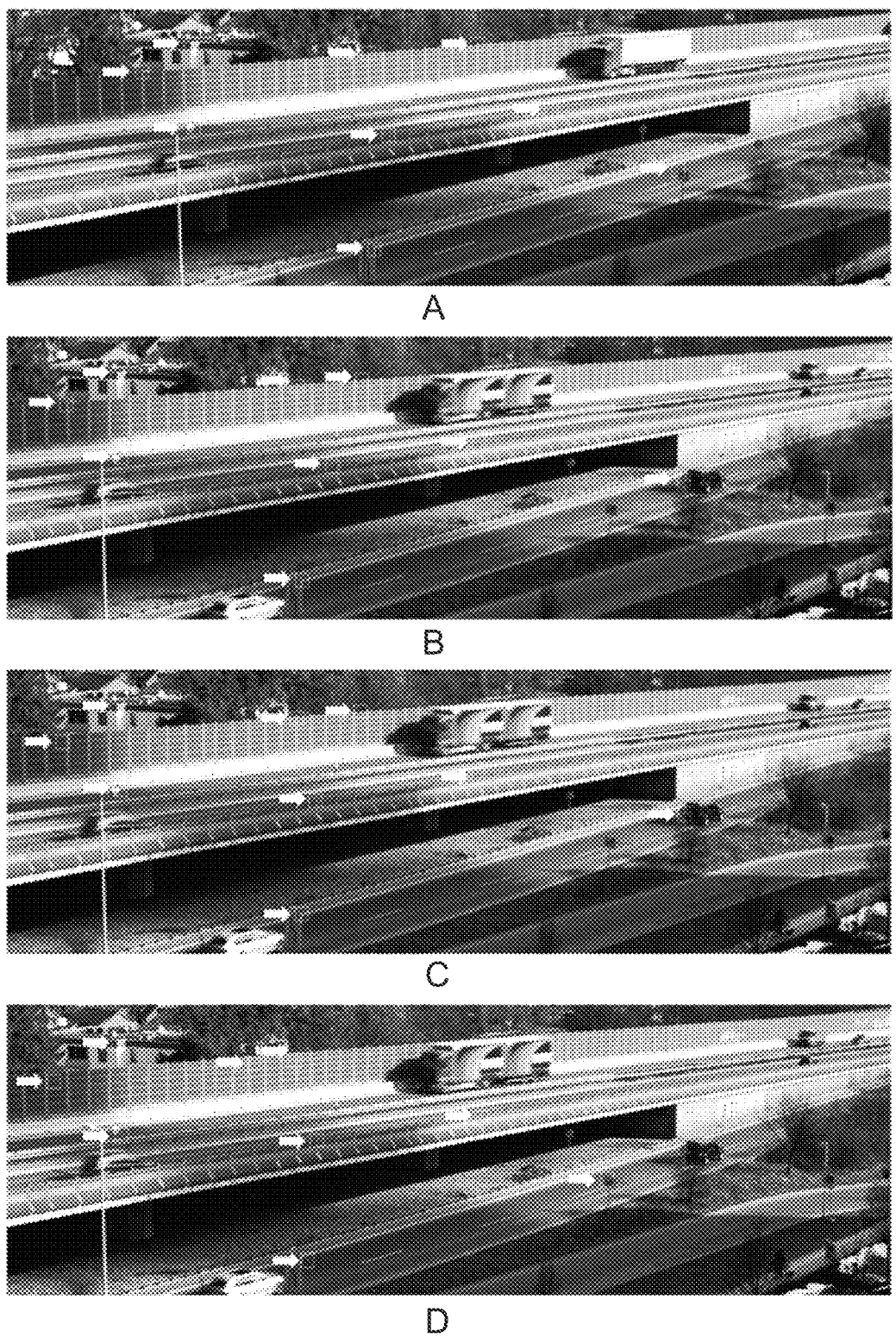
FIG. 5 a frame from an HD frame sequence with tracked points of interest, with 2, 4 and 6 integer-pel levels of hierarchy, and 6 integer-pel levels with ½-, ¼- and ⅛-pel refinement in the bottom picture.

FIG. 5A shows a beginning frame from an HD frame sequence with defined points of interest (the white arrows are pointing to squares around the PoI). FIGS. 5B and 5C show the FIG. 5A frame with tracked PoIs with 4 and 6 integer-pel levels of hierarchy, respectively, and FIG. 5D with 6 integer-pel levels plus ½-, ¼- and ⅛-pel refinement. Starting from the FIG. 5A frame, hierarchical motion estimation has been carried out in forward direction in order to track these PoIs over a hundred frames. Some tricky points have been included and show what happens if another moving object passes by closely: three of the points are located at the fence of the highway at the top of some of its periodic posts where a truck is closely passing by. As a result some points are 'caught' by the truck and carried away with it. The other points keep their position, even the point at the street lamp behind which a car passes by keeps its position.

The results differ somewhat whether 4 or 6 levels of hierarchy are used. In case of 6 integer levels of hierarchy also the two points on top of the posts in the front side wall of the highway behind which a car passes by keep their position.

Sub-pel motion estimation has first been carried out before using the above-described processing. With ⅛-pel resolution as an example, the point at the small rectangular road sign at the right is kept while it is moved by the passing dark car to the small round road sign otherwise. However, for other points, e.g. in the fence, at the street lamp or the big rectangular road sign at the bottom, points only deviate somewhat from their original position.

In the motion estimation, due to the measurement window, however small it may be, a match is actually found for a small part of the image rather than for a single picture element. As described above, the motion vector rounding can lead to a difference with respect to the match found in the last integer-pel level of the hierarchy, and such differences accumulate and turn into positioning deviations over time. In case of motion estimation with ½-pel resolution and without any further measures, such deviations have been found to be much larger than with ⅛-pel estimation (see FIG. 6A).

Figure 6:
FIG. 6 the frame of FIG. 5 with tracked points of interest in case of 6 integer-pel levels of hierarchy and ½-pel refinement:
 (a) always rounding,
 (b) rounding/cutting off on a frame basis,
 (c) rounding/cutting off on an occurrence basis.
Figure 6:
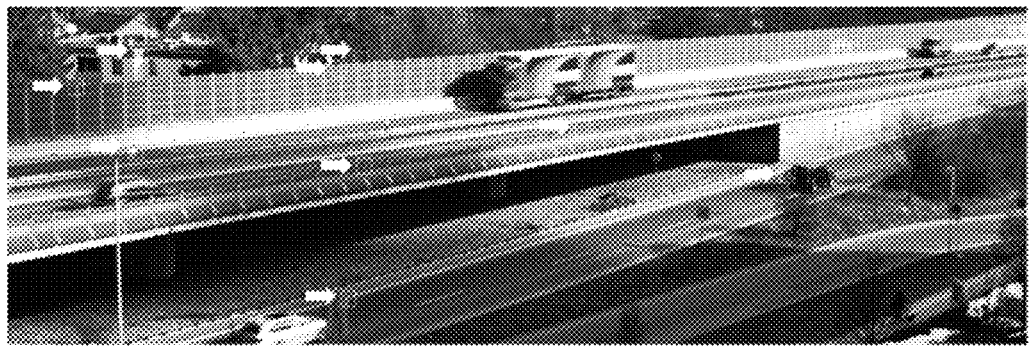
Figure 6:
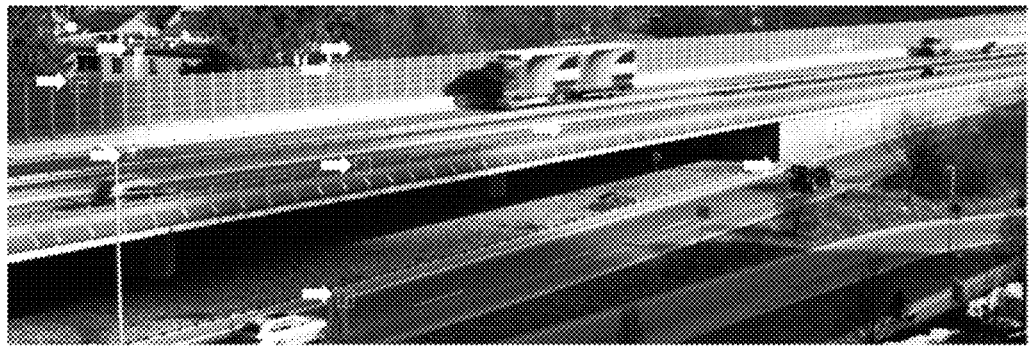

In FIG. 6 six integer-pel levels of hierarchy and ½-pel refinement were used.

In FIG. 6A rounding was always carried out.

In FIG. 6B rounding/cutting off was carried out alternately from frame to frame, using rounding in odd frames and cutting off in even frames.

In FIG. 6C the mode was alternated with respect to the previous occurrence of rounding/cutting off.

Figure 7:
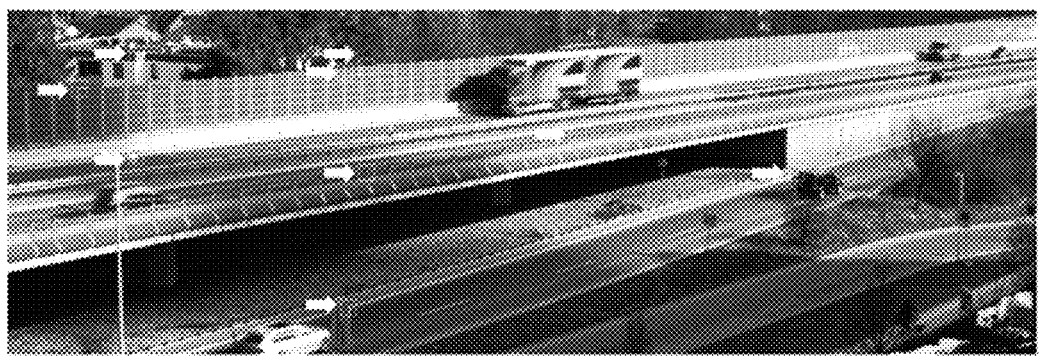
FIG. 7 the frame of FIG. 5 with tracked points of interest in case of 6 integer-pel levels of hierarchy and ½-pel refinement:
 (a) rounding with storage of sub-pel offsets and adding to final estimate in next frame,
 (b) rounding with storage of sub-pel offsets and adding to final estimate in next frame, with rounding of ½-pel estimates with 4 neighbors to the most similar neighbor,
 (c) like (b) with 4 or 2 neighbors.
Figure 7:
Figure 7:
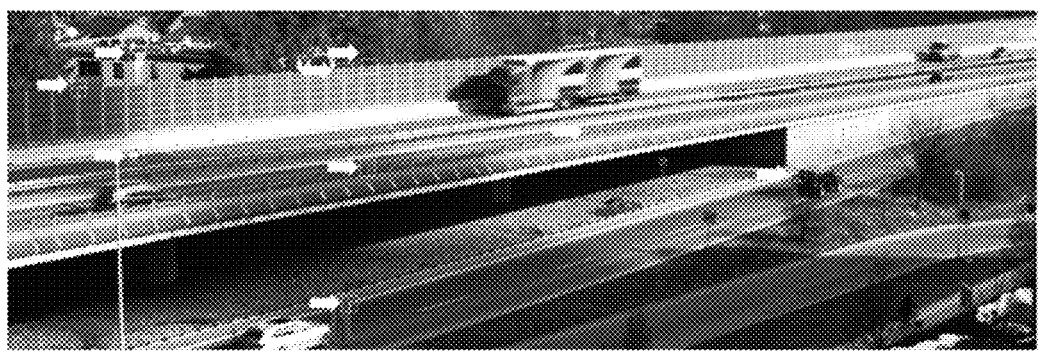

In the enhanced processing in FIG. 7A, the sub-pel components cut-off were stored and added to the final vector with sub-pel resolution estimated in the next frame processed.

In FIG. 7B, in addition to FIG. 7A, those ½-pel estimates found that have four integer-pel neighbors were rounded to the most similar neighbor.

In FIG. 7C, in addition to FIG. 7A, those ½-pel estimates found that have four or two integer-pel neighbors were rounded to the most similar neighbor.

Frame-based rounding/cutting off (see FIG. 6B) yields significant improvement for the tracked coordinates with respect to always-rounding (see FIG. 6A). For some pixels it is almost as good as integer-pel estimation, and there are better and worse cases. Occurrence-based rounding/cutting off (see FIG. 6C) is preferred, also over integer-pel estimation, as it shows further improved results.

Rounding with offset storage and add shows very similar results (see FIG. 7A) as occurrence-based rounding/cutting off. No accumulation of location offsets or rounding errors is occurring because offsets are always compensated with the next frame processed (whether in forward or backward direction).

Rounding with offset storage and add and with rounding of ½-pel coordinates that have four neighbors to the neighbor with the most similar image signal shows very similar results (see FIG. 7B). Some points are the same, some are a little worse while others are a little better.

Rounding with offset storage and add and with rounding of ½-pel coordinates that have four or two neighbors to the neighbor with the most similar image signal shows again slightly better results (see FIG. 7C).

Although the processing is focusing at the application of targeted content it is likewise applicable to many other applications requiring motion estimation and/or object or point tracking.

The described processing can be carried out by a single processor or electronic circuit, or by several processors or electronic circuits operating in parallel and/or operating on different parts of the complete processing.

The instructions for operating the processor or the processors according to the described processing can be stored in one or more memories. The at least one processor is configured to carry out these instructions.

The invention claimed is:

1. A method for tracking motion of an image content, wherein the image content is selected from a point of interest or an object or a group of pixels, in a video frames sequence using sub-pixel resolution motion estimation, comprising:
   a) estimating the motion of an image content between a reference frame and a following or preceding frame, starting from an integer pixel position in said reference frame;
   b) if an end point of a corresponding motion vector has a position between integer pixel positions in said following or preceding frame, replacing the coordinates of said motion vector end point with the coordinates of an adjacent integer pixel position in said following or preceding frame, and storing an error value between said end point coordinates and said replacement coordinates;
   c) defining said following or preceding frame as a current frame, and estimating the motion of said image content between said replacement coordinates in said current frame and said following or preceding frame; and
   d) correcting said following or preceding frame end point coordinates of the corresponding motion vector by using said stored error value in opposite direction, so as to get a corresponding precise motion vector.

2. The method according to claim 1, further comprising:
   e) if the end point coordinates of said precise motion vector have a position between integer pixel positions in said following or preceding frame, replacing the coordinates of said precise motion vector end point with the coordinates of an adjacent integer pixel position in said following or preceding frame, and storing the error value between said end point coordinates and said replacement coordinates;
   f) continuing with step c) for further frames of said video frames sequence.

3. The method according to claim 1, wherein said motion vector end point coordinates are ½-pel resolution coordinates and said coordinates replacing is a rounding away from zero and a cut-off towards zero in an alternating manner from frame to frame, using rounding mode in odd frames and cutting-off mode in even frames, or vice versa, while tracking a point of interest or an object.

4. The method according to claim 3, wherein said rounding or cutting off is not alternated frame-wise but is alternated with respect to the previous occurrence of rounding or cutting off such that, while tracking said image content, rounding of a motion vector in one occurrence is followed by cutting off in the next occurrence, and vice versa.

5. The method according to claim 1, wherein said motion estimation is a hierarchical motion estimation.

6. The method according to claim 1, wherein said motion estimation is a hierarchical motion estimation using sub-pel resolution levels, wherein the sub-pel resolution levels are one of ½-pel, ¼-pel and ⅛-pel resolution levels, and wherein said error value between said motion vector end point coordinates and said replacement coordinates is subdivided into its ½-pel, ¼-pel and ⅛-pel contributions, respectively, and the ½-pel part of said error value is added prior to a ½-pel refinement level, the ¼-pel part of said error value is added prior to a ¼-pel refinement level, and the ⅛-pel part of said error value is added prior to a ⅛-pel refinement level, respectively.

7. The method according to claim 6, wherein said error value between said motion vector end point coordinates and said replacement coordinates is added only after the finest sub-pel level of the motion estimation hierarchy.

8. The method according to claim 1, wherein in case of ½-pel resolution coordinate in x and y directions of said motion vector end point said rounding or cutting off is carried out towards the amplitude value of that neighboring pixel out of the four neighboring pixels which has an amplitude value most similar to an interpolated amplitude value of the ½-pel coordinate interpolated pixel.

9. The method according to claim 1, wherein in case of ½-pel resolution coordinate in x or y directions of said motion vector end point said rounding or cutting off is carried out towards the amplitude value of that neighboring pixel out of the two horizontally or vertically neighboring pixels which has an amplitude value most similar to an interpolated amplitude value of the ½-pel coordinate interpolated pixel.

10. The method according to claim 1, wherein several items of image content are tracked in said video frames sequence.

11. An apparatus for tracking motion of an image content, wherein the image content is selected from a point of interest or an object or a group of pixels, in a video frames sequence using sub-pixel resolution motion estimation, said apparatus comprising means adapted to:
   a) estimate the motion of an image content between a reference frame and a following or preceding frame, starting from an integer pixel position in said reference frame;
   b) if an end point of a corresponding motion vector has a position between integer pixel positions in said following or preceding frame, replace the coordinates of said motion vector end point with the coordinates of an adjacent integer pixel position in said following or preceding frame, and store an error value between said end point coordinates and said replacement coordinates;
   c) define said following or preceding frame as a current frame, and estimate the motion of said image content between said replacement coordinates in said current frame and said following or preceding frame; and
   d) correct said following or preceding frame end point coordinates of the corresponding motion vector by using said stored error value in opposite direction, so as to get a corresponding precise motion vector.

12. The apparatus according to claim 11, further comprising:
   e) if the end point coordinates of said precise motion vector have a position between integer pixel positions in said following or preceding frame, replace the coordinates of said precise motion vector end point with the coordinates of an adjacent integer pixel position in said following or preceding frame, and store the error value between said end point coordinates and said replacement coordinates;
   f) continue with process c) for further frames of said video frames sequence.

13. The apparatus according to claim 11, wherein said motion vector end point coordinates are ½-pel resolution coordinates and said coordinates replacing is a rounding away from zero and a cut-off towards zero in an alternating manner from frame to frame, using rounding mode in odd frames and cutting-off mode in even frames, or vice versa, while tracking a point of interest or an object.

14. The apparatus according to claim 13, wherein said rounding or cutting off is not alternated frame-wise but is alternated with respect to the previous occurrence of rounding or cutting off such that, while tracking said image content, rounding of a motion vector in one occurrence is followed by cutting off in the next occurrence, and vice versa.

15. The apparatus according to claim 11, wherein said motion estimation is a hierarchical motion estimation.

16. The apparatus according to claim 11, wherein said motion estimation is a hierarchical motion estimation using sub-pel resolution levels, wherein the sub-pel resolution levels are one of ½-pel, ¼-pel and possibly ⅛-pel resolution levels, and wherein said error value between said motion vector end point coordinates and said replacement coordinates is subdivided into its ½-pel, ¼-pel and ⅛-pel contributions, respectively, and the ½-pel part of said error value is added prior to a ½-pel refinement level, the ¼-pel part of said error value is added prior to a ¼-pel refinement level, and the ⅛-pel part of said error value is added prior to a ⅛-pel refinement level, respectively.

17. The apparatus according to claim 16, wherein said error value between said motion vector end point coordinates and said replacement coordinates is added only after the finest sub-pel level of the motion estimation hierarchy.

18. The apparatus according to claim 11, wherein in case of ½-pel resolution coordinate in x and y directions of said motion vector end point said rounding or cutting off is carried out towards the amplitude value of that neighboring pixel out of the four neighboring pixels which has an amplitude value most similar to an interpolated amplitude value of the ½-pel coordinate interpolated pixel.

19. The apparatus according to claim 11, wherein in case of ½-pel resolution coordinate in x or y directions of said motion vector end point said rounding or cutting off is carried out towards the amplitude value of that neighboring pixel out of the two horizontally or vertically neighboring pixels which has an amplitude value most similar to an interpolated amplitude value of the ½-pel coordinate interpolated pixel.

20. The apparatus according to claim 11, wherein several items of image content are tracked in said video frames sequence.

21. An apparatus for tracking motion of an image content, wherein the image content is selected from a point of interest or an object or a group of pixels, in a video frames sequence using sub-pixel resolution motion estimation, comprising: a memory that stores data which control operation of a processor; said processor, which executes a procedure comprising:
   a) estimating the motion of an image content between a reference frame and a following or preceding frame, starting from an integer pixel position in said reference frame;
   b) if an end point of a corresponding motion vector has a position between integer pixel positions in said following or preceding frame, replacing the coordinates of said motion vector end point with the coordinates of an adjacent integer pixel position in said following or preceding frame, and storing an error value between said end point coordinates and said replacement coordinates;
   c) defining said following or preceding frame as a current frame, and estimating the motion of said image content between said replacement coordinates in said current frame and said following or preceding frame; and
   d) correcting said following or preceding frame end point coordinates of the corresponding motion vector by using said stored error value in opposite direction, so as to get a corresponding precise motion vector.

22. The apparatus according to claim 21, carrying out the further processing:
   e) if the end point coordinates of said precise motion vector have a position between integer pixel positions in said following or preceding frame, replacing the coordinates of said precise motion vector end point with the coordinates of an adjacent integer pixel position in said following or preceding frame, and storing the error value between said end point coordinates and said replacement coordinates;
   f) continuing with step c) for further frames of said video frames sequence.

* * * * *